US012152426B2

(12) United States Patent
Oliver

(10) Patent No.: US 12,152,426 B2
(45) Date of Patent: Nov. 26, 2024

(54) BATHTUB DOOR HINGE ASSEMBLY AND METHOD

(71) Applicant: Daniel Oliver, Linden, TN (US)

(72) Inventor: Daniel Oliver, Linden, TN (US)

(*) Notice: Subject to any disclaimer, the term of this patent is extended or adjusted under 35 U.S.C. 154(b) by 190 days.

(21) Appl. No.: 17/969,385

(22) Filed: Oct. 19, 2022

(65) Prior Publication Data

US 2023/0160245 A1 May 25, 2023

Related U.S. Application Data

(60) Provisional application No. 63/281,372, filed on Nov. 19, 2021.

(51) Int. Cl.
*E05D 7/00* (2006.01)
*A47K 3/00* (2006.01)

(52) U.S. Cl.
CPC .............. *E05D 7/009* (2013.01); *A47K 3/006* (2013.01); *E05Y 2900/114* (2013.01)

(58) Field of Classification Search
CPC .......... E05D 7/009; A47K 3/006; A47K 3/36; E05Y 2900/114
USPC .............................................. 4/555–556, 538
See application file for complete search history.

(56) References Cited

U.S. PATENT DOCUMENTS 3,863,275 A * 2/1975 Brendgord ............. A47K 3/022 4/569
4,583,251 A * 4/1986 Furst ...................... A47K 3/022 4/557
5,351,345 A * 10/1994 Sills ....................... A47K 3/006 4/557
8,732,871 B2 * 5/2014 Neidich .................. E05D 15/04 4/556
10,655,309 B1 * 5/2020 Oliver ..................... A47K 3/006
D916,253 S * 4/2021 O'Brien ........................ D23/279
11,085,178 B1 * 8/2021 Oliver ..................... A47K 3/006

(Continued)

FOREIGN PATENT DOCUMENTS

CA 3179451 A1 * 5/2023 ............. A47K 3/006

OTHER PUBLICATIONS

Kolar Co., Kolar Walk-In Bath Benefits And Features, https://www.kohlerwalkinbath.com/free-estimate/benefits/ (Kohler, Wisconsin) (2023).

(Continued)

*Primary Examiner* — Lori L Baker
(74) *Attorney, Agent, or Firm* — Baker Donelson; Dorian B. Kennedy; Carl M. Davis, II

(57) ABSTRACT

Articulating linkage having a pair of bathtub arms pivotally coupled at a first end to bathtub mounting blocks through a first pivot rod and pivotally coupled at a second end to a pair of door arms through a second pivot rod. Each door arm pivotally coupled at an opposite end to a door mounting block of a bathtub door through a third pivot rod. A spring mounted about the first pivot rod enables the the bathtub door to rise. A method of door opening for a walk-in bathtub comprises the steps of pivoting inwardly the door hinged by the articulating linkages to a door jamb of a walk-in bathtub, moving the door vertically on the pivot rods, and passing the door through the opening, and the door closing by passing the door inwardly through the opening, moving the door vertically on the pivot rods, and pivoting the door closed.

22 Claims, 3 Drawing Sheets

(56) References Cited

U.S. PATENT DOCUMENTS

| | | | | |
|---|---|---|---|---|
| 2016/0271012 | A1 | 9/2016 | Xu | |
| 2023/0014493 | A1* | 1/2023 | Stafford | A47K 3/003 |

OTHER PUBLICATIONS

Lowes, https://www.lowes.com/pd/American-Standard-30-in-W-x-52-in-L-White-Gelcoat-Fiberglass-Rectangular-Right-Hand-Drain-Walk-In-Whirlpool-Tub-and-Faucet-Included/1000183193 (Mooresville, N.C), printed Dec. 25, 2022).

Kolar Co., Kolar Walk-In Bath, https://www.kohlerwalkinbath.com/free-estimate/?kw=walk-in%20bathtubs&src=g&gclid=CjwKCAiAhqCdBhB0EiwAH8M_GrH73RuuTt30dduSBvWvpNjXWf9ZdyFTVhrNRIZ_qIBGA7Jv5WektxoCDjoQAvD_BwE (Kohler, Wisconsin) (2022).

* cited by examiner

BATHTUB DOOR HINGE ASSEMBLY AND METHOD

TECHNICAL FIELD

This invention relates generally to door hinges, and more particularly to door hinge assemblies for walk-in type bathtubs.

BACKGROUND OF THE INVENTION

Generally, many elderly or mobile-restricted persons find bathing to be awkward and difficult with conventional step-over side-wall bathtubs. The outside wall of side-wall bathtubs, while retaining water for bathing, presents an obstacle over which the bather must step in order to enter and egress the bathtub. Lifting the bather's leg and moving over the upper edge of the side wall requires balance and care.

Bathtubs have been developed for use by the elderly and mobility-restricted persons, which feature deep water-holding cavities and include a door that enables "walk-in" ingress and egress to and from the bathtub through a passage in a sidewall closed by the door. The threshold of such passage is lower than an upper extent of the side wall. The bather opens the door when entering the walk-in bathtub, and then close and seal the door behind the bather to prevent water from escaping the bathtub during use. To exit the bathtub, the bathtub is drained to a water level lower than a threshold, and then the door is unsealed and opened.

Bathtubs having the door sealed against the outside or exterior of the bathtub, bathtub surround, or bathtub door jamb must have a very good seal and latching device to prevent water from leaking about the door. Even with a very good seal, water leakage may occur between the door and bathtub surround. Therefore, some bathtubs are designed to have the door sealed against the inside or interior surface of the bathtub, so that the hydrostatic pressure of the water within the bathtub forces the door against the seal and door jamb to provide a better sealing of the door.

However, a problem with these interior sealing doors is that the door swings into the bathtub when the door is opened, and thus the door encroaches into the bathtub area occupied by the bather. As a result, the bathtub must be made bigger than necessary to accommodate both the person within the bathtub and the area of door movement. Also, the inward swinging of the door forces the person within the bathtub to move out of the way of the swinging door, which increases the possibility of the person slipping or falling within the bathtub.

Accordingly, there is a need in the art for a hinge that will allow for interior mounting of a bathtub door during use but that also limits the encroachment of the door into the bathtub during ingress or egress. It is to the provision of such therefore that the present invention is primarily directed.

SUMMARY OF THE INVENTION

The present invention meets the need in the art with, in a preferred form of the invention, a bathtub hinge assembly for a walk-in bathtub having a bathtub surround, a door jamb, and a door. The bathtub hinge comprises at least one bathtub mounting block mounted to the exterior surface of the bathtub surround, at least one door mounting block mounted to the exterior surface of the bathtub door, and an articulating linkage coupled to the at least one bathtub mounting block and the at least one door mounting block.

The articulating linkage includes at least one bathtub arm pivotally coupled to the at least one bathtub mounting block, and at least one door arm pivotally coupled to the at least one bathtub arm and pivotally coupled to the at least one door mounting block.

In another aspect, the present invention provides a bathtub hinge assembly comprising at least one bathtub mount and at least one door mount, with at least one first arm pivotally coupled to said at least one bathtub mount for both vertical movement and pivotal movement of said at least one first arm relative to said at least one bathtub mount, and at least one second arm pivotally coupled at one end to said first arm and pivotally coupled at an opposite end to said at least one door mount In yet another aspect, the present invention also meets the need in the art with a method of door closure and opening for a walk-in bathtub that comprises the steps of:

providing a door for moving inwardly of a sidewall and threshold of a walk-in bathtub and outwardly for fitting against an interior surface of a jamb that defines a passage through the side wall;

hingedly mounting the door to a pair of bathtub mounts that mount to an exterior face of the side wall and a pair of door mounts that mount to an exterior face of the door, with a pair of articulating linkages that each pivotally connect to and between a respective bathtub mount and door mount; and interconnecting the hinged mounting with a first pivot rod between the pair of bathtub mounts, a second pivot rod between the articulating linkages, and a third pivot rod between the pair of door mounts, the first pivot rod movable relative to the bathtub mounts for vertical movement of the door. The door being movable on the hinged mounting inwardly and upwardly for then, upon pivoting of the door on the articulating linkages, passing outwardly of the side wall through the passage for bather ingress or egress through the passage.

Objects, advantages and features of the present invention will become readily apparent upon a reading of the following detailed description in conjunction with the drawings.

BRIEF DESCRIPTION OF THE DRAWINGS

FIG. 1 illustrates a perspective view of a walk-in bathtub with a door having the hinge assembly according to the present invention, with the door in a closed position for sealing water within the walk-in bathtub for bathing.

FIG. 2 illustrates the walk-in bathtub with the door moved inwardly of a jamb and upwardly of a threshold that define a passage in a side wall of the bathtub.

FIG. 3 illustrates the walk-in bathtub with the door pivoted outwardly through the passage in the side wall and over the threshold portion of the door jamb.

FIG. 4 illustrates the door during continued outward opening movement of the door through the passage until the entire door is clear of the door jamb.

FIG. 5 illustrates the door further opened through continued pivoting movement to an open position for bather entry or egress though the passage in the side wall of the walk-in bathtub with a portion of the door cut-away to illustrate a portion of the hinge assembly.

DETAILED DESCRIPTION

Figure 4:
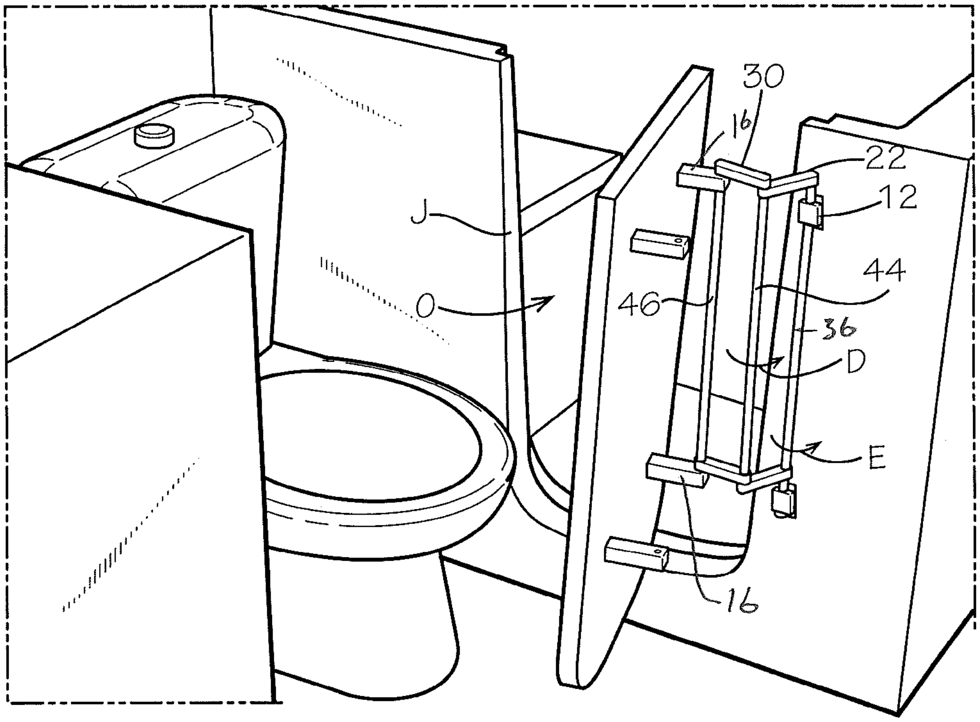

With reference next to the drawings in which like parts have like identifiers, there is shown a hinge assembly 10 for a walk-in type bathtub according to the present invention. It is to be appreciated that the hinge assembly 10 shown in the drawings is configured for use with a walk-in type bathtub door D that fits against the interior surface of a door jamb J of a bathtub surround S. The door jamb J defines a door opening or pass-through O, as shown in FIG. 4, for a passage through which a bather enters and egresses the bathtub. A seal mounted to either the door D or jamb J aids in preventing water from passing therebetween when the door is in a closed position. The jamb J, door D and seal are well-known in the art and need not be disclosed further herein.

The walk-in bathtub conventionally includes a water inlet with selective hot and cold water supply, a drain, and a pump configured with a controller for selectively providing (i) hydrotherapy of pressurized water flow through side wall jets disposed for directing the jetted water against the legs, back and sides of a bather and (ii) microbubbles through the jets which keep bath water warm and further warms the bather's body and relaxingly stimulates the skin. Upon exiting the bath following a microbubble therapy, the warm feeling experienced by the bather persists as a relaxation and may improve sleep. The bathtub components of the water inlet, water supply, drain, and pump and controller, and operation of same, are well-known in the art and need not be disclosed further herein.

The hinge assembly 10 includes a pair of bathtub mounts, mounting blocks, supports, or members 12 that are mounted to the exterior facing surface 14 of the bathtub surround S adjacent to the door jamb J. The hinge assembly 10 also includes a pair of door mounts, mounting blocks, supports, or members 16 that are mounted to the exterior facing surface 17 of the door D. The bathtub mounting blocks 12 and door mounting blocks 16 may be made of any suitable material, such as a metal, plastic, polymer, or other material for a wet environment.

The hinge assembly 10 also includes articulating linkage 18 mounted to and extending between the bathtub mounting blocks 12 and the door mounting blocks 16. The articulating linkage 18 has a pair of first or bathtub arms 22 pivotally coupled at a first end 24 to the bathtub mounting blocks 12. The bathtub arms 22 are also pivotally coupled at oppositely disposed, second ends 26 to first ends 28 of a pair of second or door arms 30. Each door arm 30 pivotally couples at an oppositely disposed second end 32 to one of the door mounting blocks 16.

The first ends 24 of the bathtub arms 22 pivotally couple to the bathtub mounting blocks 12 through a first pivot rod 36. The first pivot rod 36 passes through a first pivot rod mounting hole 38 within the bathtub mounting blocks 12 for both vertical movement of the first pivot rod 36 relative to the bathtub mounting blocks 12, and for pivotal movement of the first pivot rod 36 relative to the bathtub mounting blocks 12 and the bathtub surround S coupled to the bathtub mounting blocks 12. A spring 40 may be mounted about the first pivot rod 36 between the bathtub mounting block 12 and the bathtub arms 22 to force or bias the bathtub arms 22 upwardly relative to the bathtub mounting blocks 12. The bottom end of the first pivot rod 36 has an enlarged end or stop 37 to limit the upward movement of the first pivot rod 36 and prevent the first pivot rod 36 from being removed from the bathtub mounting blocks 12.

The second ends 26 of the bathtub arms 22 couple to the first ends 28 of the door arms 30 through a second pivot rod 44. The second pivot rod extends between each of the bathtub arms 22 and each of the door arms 30. The second pivot rod 44 allows for mutual pivotal movement of the bathtub arms 22 relative to the door arms 30.

The second ends 32 of the door arms 30 couple to the door mounting blocks 16 through a third pivot rod 46. The third pivot rod 46 allows for pivotal movement of the door arms 30 relative to the door mounting blocks 16 and the door D coupled to the door mounting blocks 16.

The door D or surround S is provided with a conventional latch L that secures the door D to the surround S while also forcing the door D downwardly and toward the jamb J to maintain a proper watertight seal therebetween. Preferably, the latch L forces the door D downwardly against the biasing force of the spring 40 in the final movement of the door D against the door jamb J. The latch L may have a cam surface that moves the door inwardly against the seal.

Figure 1:
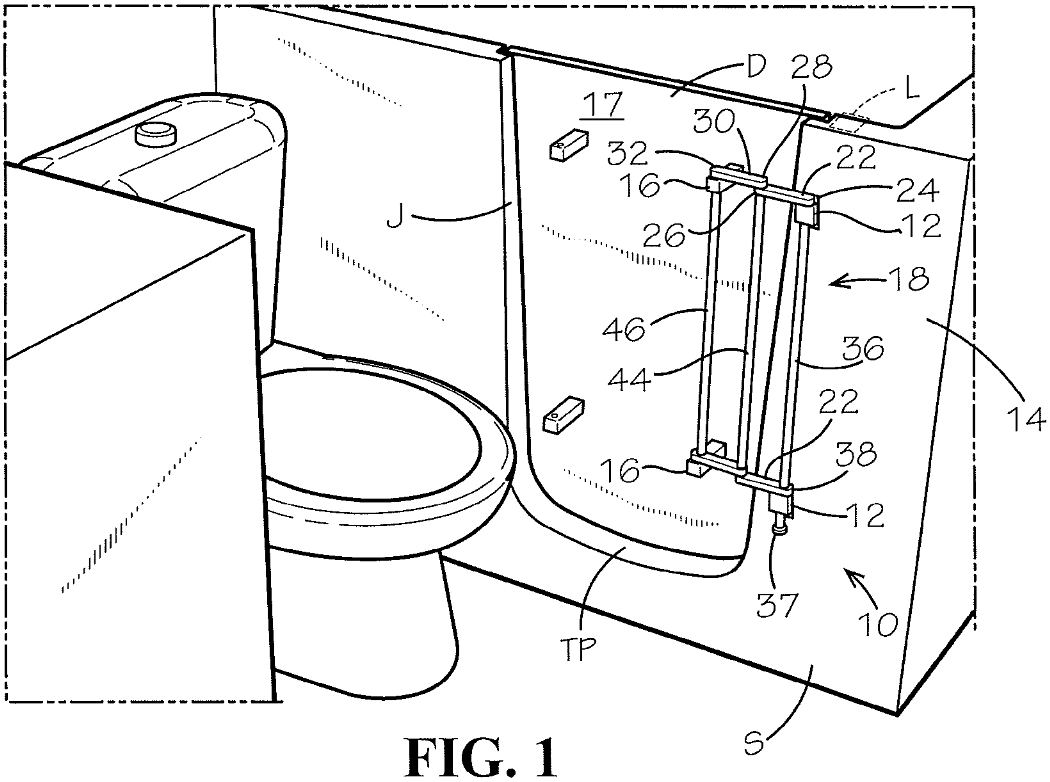
FIGS. 1-5 are a series of perspective views of a hinge assembly for a door of a walk-in bathtub embodying principles of the invention in a preferred form, and further illustrating the opening and closing operative sequence of the door hinge.
Figure 5:
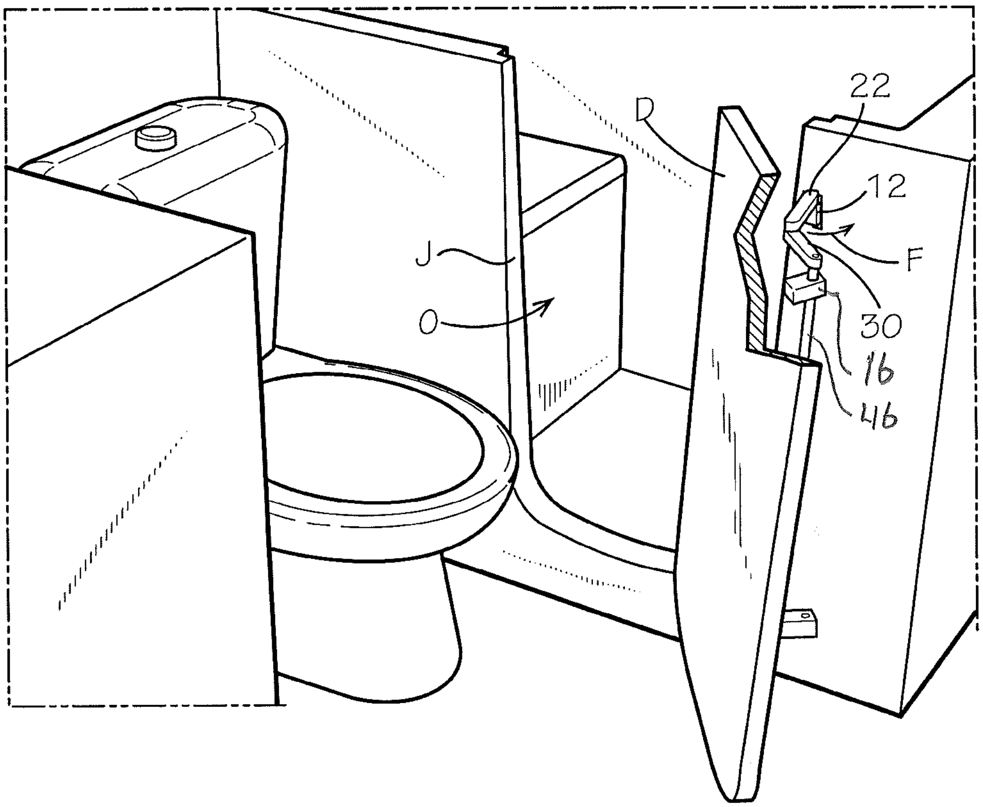

In use, the door D may be moved from a closed position, shown in FIG. 1, to an open position, shown in FIG. 5, or visa-vera. With the door D is the closed position, shown in FIG. 1, the door D is forced against the interior surface of the door jamb J by the latch L to provide a watertight seal therebetween.

Figure 2:
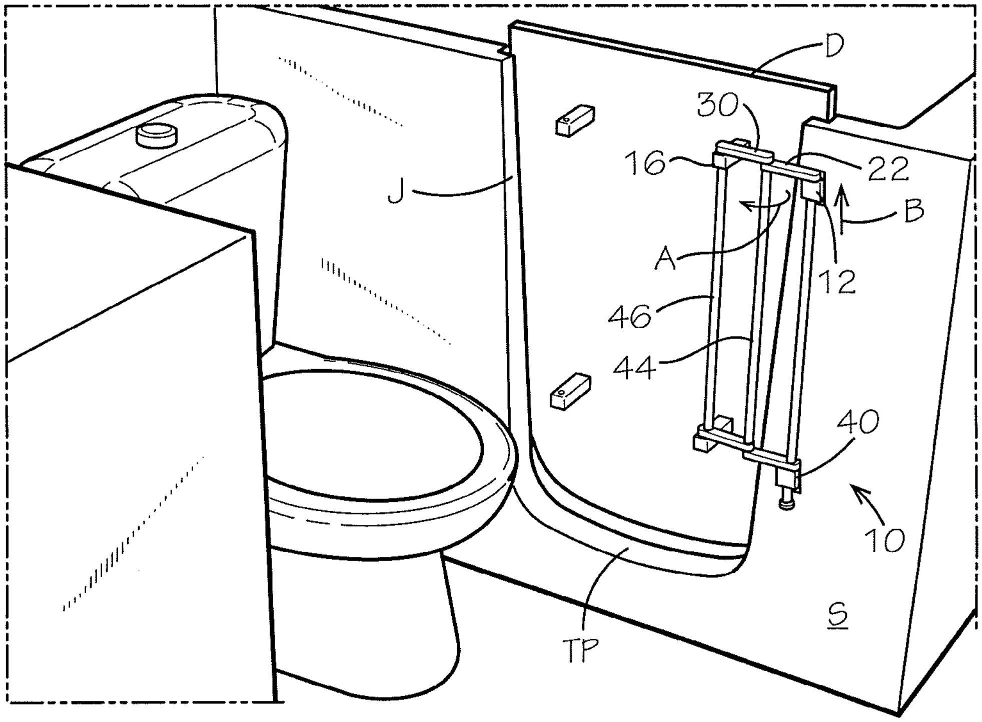

To open the door for egress or exiting from the bathtub T, the latch L is released and the door D is initially moved slightly inwardly into the bathtub T by pivoting of the door arms 30 relative to the bathtub arms 22 through the second pivot rod 44, as illustrated by arrow A in FIG. 2. The release of the door D allows the biasing force of the spring 40 to vertically lift or raise the door D. This vertical movement of the door D is accomplished through the vertical movement of the first pivot rod 36 relative to the bathtub mounting blocks 12, as illustrated by arrow B in FIG. 2. The vertical movement of the door D is necessary for the door D to pass over the threshold portion TP of the door jamb J at a later time during the door opening sequence.

Figure 3:
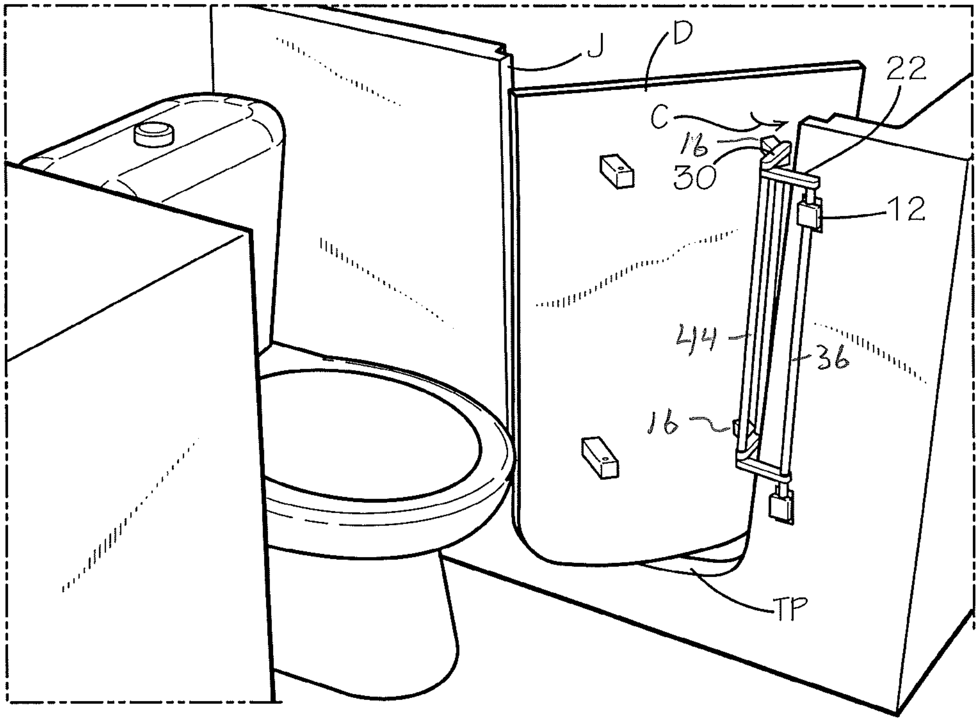

Once the door D has been moved slightly into the interior space of the bathtub, the door D may commence to be pivoted outwardly and over the threshold portion TP of the door jamb J, as shown in FIG. 3. The door D is pivoted through the pivoting movement of the door arms 30 relative to the door mounting blocks 16 through the third pivot rod 46, as illustrated by arrow C in FIG. 3. Thus, the now raised door D passes over or clears the threshold portion TP of the door jamb J.

The door arms 30 pivot about the second pivot rod 44, as illustrated by arrow D in FIG. 4, and the bathtub arms 22 pivot about the first pivot rod 36, as illustrated by arrow E in FIG. 4, to provide continued outward opening movement of the door D until the entire door D is clear of the door jamb J, as shown in FIG. 4. If further clearance or opening of the door is necessary, the door D may continue to be further opened through continued pivoting movement of the bathtub arms 22 relative to the bathtub mounting blocks 12, as illustrated by arrow F in FIG. 5.

Once the door D is fully opened, the user may exit the bathtub T through the passage in the side wall or door opening 0 defined by the door jamb J. The door D is moved from its open position, shown in FIG. 5, to its closed position, shown in FIG. 1, through a reversing of the previously described sequence.

Thus, it should be understood that the present invention allows for an interior positioned door D to provide greater sealing capabilities, while also allowing the door D to be re-positioned outside the bathtub T to allow better ingress and egress from the bathtub T.

It should be understood that other types of door lifting or raising mechanisms may be used as an alternative to the spring 40 shown in the preferred embodiment, such as camming surfaces, ramps, hydraulic or pneumatic cylinders, or the like.

It should be understood that the latch L may be a cammed hook and pin type arrangement that pulls the door towards the door jamb upon movement of the hook. Alternatively, the latch may be a ramp or camming surface that moves the door down in a direction towards the door jamb upon manual movement of the door. Other similar type latches may also be used as an alternative.

It should be understood that as an alternative to the bathtub arms 22 moving vertically with respect to the bathtub mounting blocks 12, other portions of the articulating linkage 18 may be adapted to move vertically. For example, the door mounting blocks 16 may move vertically with respect to the door arms 30.

While this invention has been described in detail with particular reference to the preferred embodiment thereof and the best mode of practicing same for a movable door that seals for retaining water within a bathing tub yet opens conveniently for entry for bathing and egress, it will be understood that variations and modifications can be effected within the spirit and scope of the invention as described herein above and as set forth in the appended claims.

What is claimed is:

1. A bathtub hinge assembly for a walk-in bathtub having a bathtub surround, a door jamb, and a door, the bathtub hinge assembly comprising:

at least one bathtub mounting block mounted to the exterior surface of a bathtub surround;

at least one door mounting block mounted to the exterior surface of a bathtub door, and an articulating linkage coupled to said at least one bathtub mounting block and said at least one door mounting block, said articulating linkage including at least one bathtub arm pivotally coupled to said at least one bathtub mounting block, at least one door arm pivotally coupled to said at least one bathtub arm and pivotally coupled to said at least one door mounting block.

2. The bathtub hinge of claim 1 wherein said articulating linkage includes two bathtub arms.

3. The bathtub hinge of claim 1 wherein said at least one bathtub arm is coupled to said at least one bathtub mounting block for vertical movement of said at least one bathtub arm relative to said at least bathtub mounting block.

4. The bathtub hinge of claim 1 wherein said at least one bathtub arm is coupled to said least one bathtub mounting block through a first pivot rod passing through said at least one bathtub mounting block for both pivotal and vertical movement of said first pivot rod relative to said at least one bathtub mounting block.

5. The bathtub hinge of claim 2 wherein said bathtub arms are coupled to said at least one bathtub mounting block through a first pivot rod passing through said at least one bathtub mounting block for both pivotal and vertical movement of said first pivot rod relative to said at least one bathtub mounting block.

6. The bathtub hinge of claim 5 wherein said articulating linkage includes two door arms.

7. The bathtub hinge of claim 6 wherein said articulating linkage includes a second pivot rod pivotally coupling said two bathtub arms to said two door arms.

8. The bathtub hinge of claim 7 wherein said two door arms are coupled to said at least one door mounting block through a third pivot rod.

9. A bathtub hinge assembly comprising:

at least one bathtub mount;

at least one door mount;

at least one first arm pivotally coupled to said at least one bathtub mount for both vertical movement and pivotal movement of said at least one first arm relative to said at least one bathtub mount, and at least one second arm pivotally coupled at one end to said first arm and pivotally coupled at an opposite end to said at least one door mount.

10. The bathtub hinge of claim 9 wherein said at least one first arm includes two first arms, and wherein said at least one second arm includes two second arms.

11. The bathtub hinge of claim 10 wherein said two first arms are coupled to said least one bathtub mount through a first pivot rod passing through said at least one bathtub mount.

12. The bathtub hinge of claim 11 wherein said two first arms are pivotally coupled to said two second arms through a second pivot rod.

13. The bathtub hinge of claim 12 wherein said two second arms are coupled to said at least one door mount through a third pivot rod.

14. A bathtub hinge assembly comprising:

at least one bathtub mount;

at least one door mount;

a pair of first links wherein each first link has a first end pivotally coupled to said at least one bathtub mount and a second end oppositely disposed from said first end, and a pair of second links wherein each second link has a first end pivotally coupled to one said second end of one said first link and a second end pivotally coupled to said at least one door mount.

15. The bathtub hinge assembly of claim 14 wherein said first ends of said first links are coupled to said at least one bathtub mount for vertical movement of said first links relative to said at least one bathtub mount.

16. The bathtub hinge of claim 15 wherein said first links are coupled to said least one bathtub mount through a first pivot rod passing through said at least one bathtub mount.

17. The bathtub hinge of claim 16 wherein said first links are pivotally coupled to said second links through a second pivot rod.

18. The bathtub hinge of claim 17 wherein said second links are coupled to said at least one door mount through a third pivot rod.

19. A method of door closure and opening for a walk-in bathtub, comprising the steps of:

providing a door for moving inwardly of a sidewall and threshold of a walk-in bathtub and outwardly for fitting against an interior surface of a jamb that defines a passage through the side wall;

hingedly mounting the door to a pair of bathtub mounts that mount to an exterior face of the side wall and a pair of door mounts that mount to an exterior face of the door, with a pair of articulating linkages that each pivotally connect to and between a respective bathtub mount and door mount; and interconnecting the hinged mounting with a first pivot rod between the pair of bathtub mounts, a second pivot rod between the articulating linkages, and a third pivot rod between the pair of door mounts, the first pivot rod movable relative to the bathtub mounts for vertical movement of the door, whereby the door being movable on the hinged mounting inwardly and upwardly for passing through the passage upon pivoting of the door on the articulating linkages outwardly of the side wall for ingress and egress through the passage.

20. The method as recited in claim 19, wherein the first pivot rod is biased to first vertical position for the door to pass over the threshold.

21. The method as recited in claim 20, wherein the first pivot rod is movable to a second vertical position for a portion of the door to fit against the threshold.

22. The method as recited in claim 20, further comprising the step of latching the door fitting against the interior surface of the side wall.

* * * * *